United States Patent [19]

Kogure et al.

[11] Patent Number: 5,032,932
[45] Date of Patent: Jul. 16, 1991

[54] HARD DISK TESTING METHOD

[75] Inventors: Toshiharu Kogure; Ryuichi Matsuzaki; Yoshitake Ueshima, all of Narashino, Japan

[73] Assignee: Seiko Seiki Kabushiki Kaisha, Japan

[21] Appl. No.: 359,572

[22] Filed: Jun. 1, 1989

[30] Foreign Application Priority Data

Jun. 22, 1988 [JP] Japan .................................. 63-136586
Jul. 22, 1988 [JP] Japan .............................. 63-97055[U]

[51] Int. Cl.⁵ ...................... G11B 27/36; G11B 5/596
[52] U.S. Cl. .................................... 360/31; 360/77.06; 360/77.11
[58] Field of Search ..................... 260/81, 77.02, 77.06, 260/77.07, 75, 106, 77.05, 77.08, 77.11; 369/53, 54; 360/106

[56] References Cited

U.S. PATENT DOCUMENTS 4,330,806  5/1982  Iwabuchi et al. ................. 360/97.01
4,754,343  6/1988  Cascio, Sr. et al. ................... 360/31

Primary Examiner—Aristotelis M. Psitos
Assistant Examiner—Varsha V. Sheladia
Attorney, Agent, or Firm—Bruce L. Adams; Van C. Wilks

[57] ABSTRACT

A hard disk testing apparatus is comprised of a pair of carriages, each provided with a pair of upper and lower heads, and one of the upper and lower heads on either of the carriages is mounted on a micro adjustment carriage. With this structure, the head mounted on the fixed carriage writes a signal, and the head mounted on the carriage equipped with the micro adjustment carriage reads the signal. The structure and operation of the apparatus effectively prevent omission or duplication of testing tracks at the border between a test range of a hard disk covered by one of the pair of carriages and another test range covered by the other carriage.

1 Claim, 3 Drawing Sheets

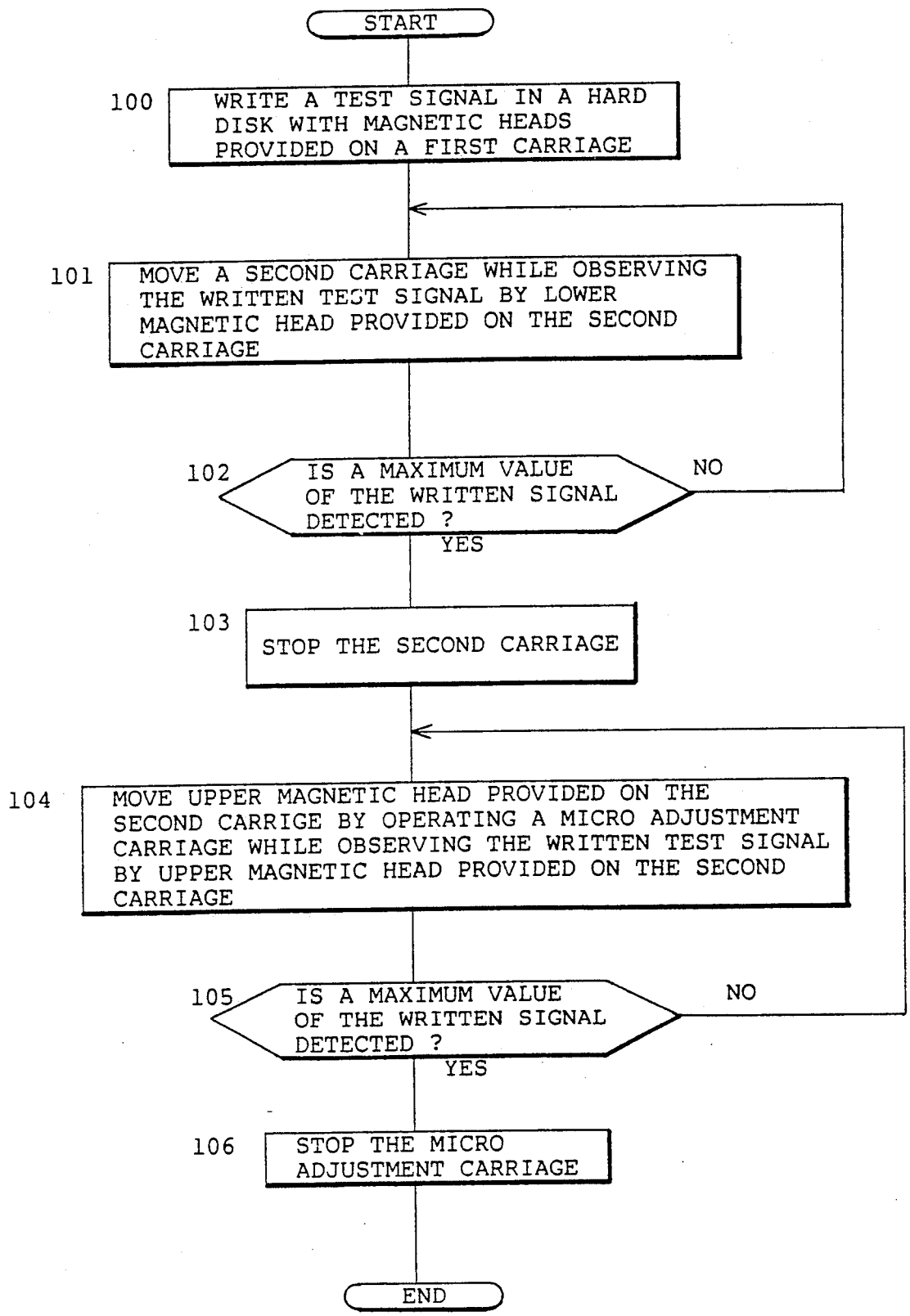

HARD DISK TESTING METHOD

BACKGROUND OF THE INVENTION

The present invention relates to the improvement of hard disk testing apparatus.

In the conventional product quality test of magnetic recording type hard disks (hereinafter called "disk"), a test apparatus is provided with a pair of carriages diametrically opposing to each other which reciprocate in the radius direction of a disk, and a pair of upper and lower magnetic heads (hereinafter called "heads") are provided on each of the carriages so that the upper (front) side and the lower (back) side of the disk are simultaneously tested (measured).

One of the carriages is driven in a manner that its heads reciprocate in the inner half of the radius of the disk, and the other carriage is driven in a manner that its heads reciprocate in the outer half of the radius of the disk. Test signals are magnetically written in the disk surface with these heads, these signals or signals remaining after erasure are read with these heads again, and based on the reading results, several test items such as missing pulse error, extra pulse error, etc. are checked.

However, in the case of the above conventional disk test apparatus, the heads are fixed to the carriage using jigs a predetermined positions. But because of fixing errors, the predetermined separations of the heads may not be obtained. Therefore when both carriages are moved in predetermined distances, problems occur in which tracks around the border between the ranges covered by the heads mounted on one of the carriages and the heads mounted on the other carriage may be doubly tested or may not be tested. It is possible to avoid this kind of problems, i.e., duplication or omission of test, by carrying out micro adjustment based on measured separations of the heads. However, this type of manual micro adjustment is time-consuming.

SUMMARY OF THE INVENTION

It is an object of the present invention to solve the problems described in the foregoing. It is another object of the invention to provide a hard disk testing apparatus having at least a pair of carriages, each equipped with a pair of upper and lower magnetic heads for simultaneously testing the front and back sides of a hard disk mounted on a rotation spindle. The carriages are provided to reciprocate the magnetic heads in the direction of the center of the hard disk. One of the pair of carriages is moved to test the inner half of the radius of the hard disk, and the other of the pair of carriages is moved to test the outer half of the radius of the hard disk. One of the upper and lower heads is mounted on a micro adjustment carriage provided on one of the carriages. It is still another object of the invention to provide the micro adjustment carriage with a micrometer feeding mechanism which is used to move one of the upper and lower heads. It is a further object of the invention to provide the method of adjustment of head positions. For the adjustment, a test signal is written in a hard disk by the heads mounted on one of the carriages, and the heads mounted on the other carriage are moved while monitoring the written signal thereby correcting positions of the heads.

BRIEF DESCRIPTION OF DRAWINGS

FIG. 4 is a flow chart of a method of adjusting magnetic heads of a hard disk testing apparatus according to the present invention.

DESCRIPTION OF THE PREFERRED EMBODIMENTS

Figure 1:
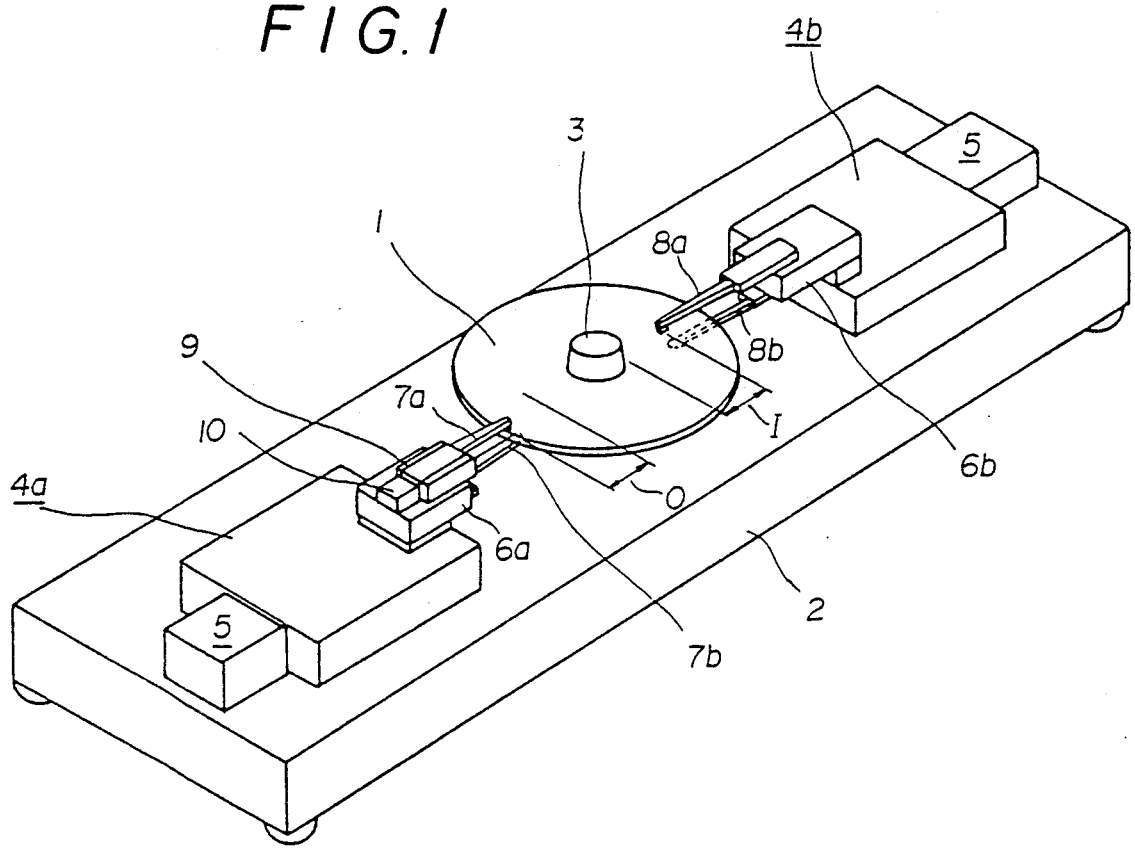
FIG. 1 is a perspective view of an embodiment of a hard disk testing apparatus equipped with a micro adjustment carriage.

The present invention is described below with reference to the accompanying drawings. FIG. 1 is a perspective view of a hard disk testing apparatus of the present invention. A hard disk 1 is mounted on a rotation spindle 3 provided on a bed 2, and rotated at a predetermined revolution speed.

A pair of carriages 4a and 4b are provided diametrically opposed to each other on the bed 2 with the rotation spindle 3 at the center therebetween. They are constructed in a manner that they are reciprocated in the direction of the center of rotation spindle 3 each by a driving motor 5 through a built-in ball screw mechanism.

Head mounting boards 6a and 6b are fixed on end portions of the carriages 4a and 4b. At the upper and lower sides of the respective head mounting boards 6a and 6b are provided pairs of upper and lower heads 7a and 7b, and 8a and 8b, which extend toward the rotation spindle 3.

The head 7a is connected to an end portion of a micro adjustment carriage 9 which is fixed to the upper face of the head mounting board 6a. The micro adjustment carriage 9 is a kind of a small sized carriage of the above 4a or 4b, and has a driving motor and built-in ball screw mechanism. It is constructed in such a manner that the head 7a is reciprocated by the ball screw mechanism in the direction of the center of the spindle 3.

On the other hand, the lower head 7b is fixedly mounted on the side of the head mounting board 6a, and the heads 7a and 7b are provided with predetermined separations from the respective upper and lower surfaces of the disk 1.

The pair of upper and lower heads 8a and 8b are fixedly mounted with the aid of jigs on the head mounting board 6b which is provided on the carriage 4b. The end faces of the heads 8a and 8b are aligned to a near vertical line and are maintained at predetermined separations from the upper and lower surfaces of the disk 1.

A procedure of the adjustment of head positions is hereunder described with reference to a flow chart shown in FIG. 4.

Now, as shown in FIG. 1, supposing that the carriage 4a is operated as an outer carriage for testing the outer half radius 0 of the disk 1, and the carriage 4b as an inner carriage for testing the inner half radius I of the disk 1. After retracting both carriages 4a and 4b, a disk 1 is set on the rotation spindle 3 for test, and is rotated at a predetermined revolution speed.

Thereafter, the carriage 4b is moved toward the rotation spindle 3 until the heads 8a and 8b reach a writing start position of the carriage 4a which is located at around the center of the measuring range of the disk 1.

At this location a test signal is written in the disk 1 by a write circuit (not shown) through the heads 8a and 8b, thereby providing a track of the test signal at around the center of the measuring range of and in both upper and lower surfaces of the disk 1 (STEP 100).

Following the above operation, the carriage 4a is moved toward the rotation spindle 3 while reading outputs of the head 7b by a read circuit (not shown) (STEP 101). When a maximum value of the signal written by the head 8b is detected (STEP 102), the carriage 4a is stopped at this position (STEP 103).

The micro adjustment carriage 9 is then moved back and forth until the head 7a detects the signal written by the head 8a (STEP 104). While observing outputs from the head 7a, the micro adjustment carriage 9 is operated to move the head 7a. At the detection of a maximum value of the written signal (STEP 105), the movement of the micro adjustment carriage 9 is stopped (STEP 106).

By the above operation, the positions at which the heads 8a and 8b are mounted are correctly adjusted. Therefore, even if there is a small difference between positions of the heads 8a and 8b, positions of the heads 7a and 7b are accordingly adjusted.

As a result, a track at which the test is started by the inner carriage and a track at which the test is completed by the outer carriage are correctly registered, and therefore omission or duplication of test of tracks at the border between an inner testing range covered by the inner carriage (e.g. the range I as shown in FIG. 1) and an outer testing range covered by the outer carriage (e.g. the range 0 as shown in FIG. 1) is effectively prevented.

Figure 2:
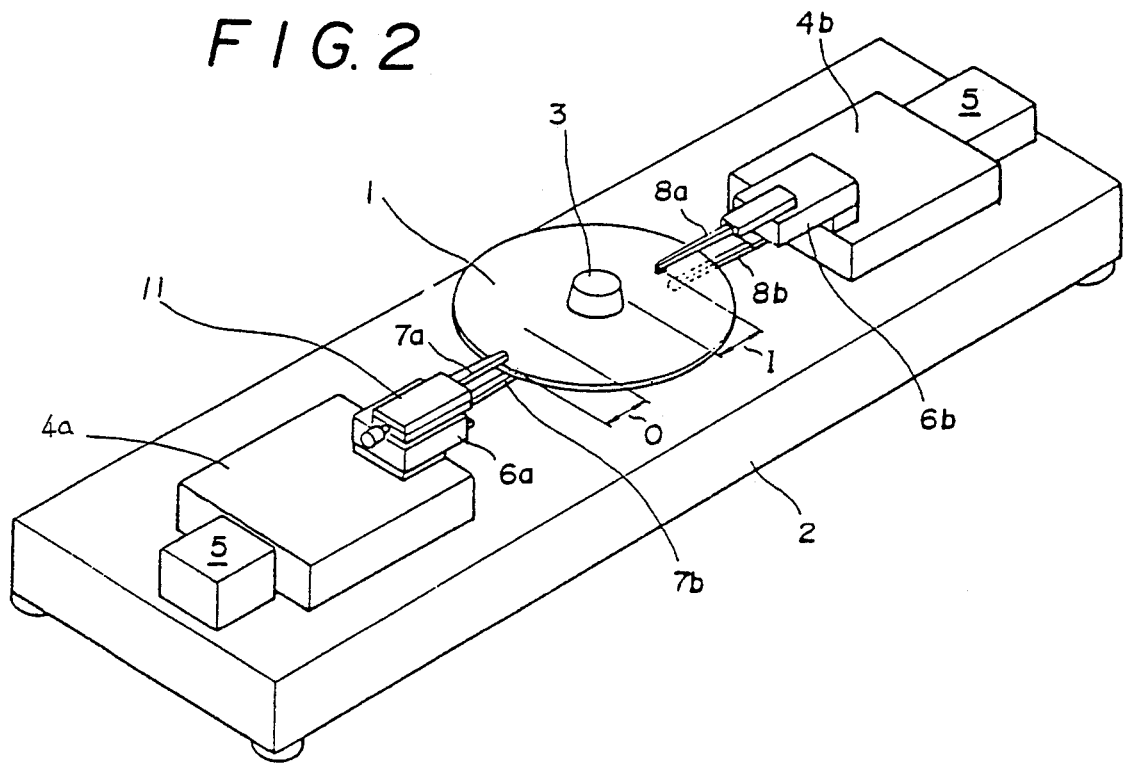
FIG. 2 is a perspective view of an embodiment of a hard disk testing apparatus equipped with a micrometer feed mechanism according to the present invention.
Figure 3:
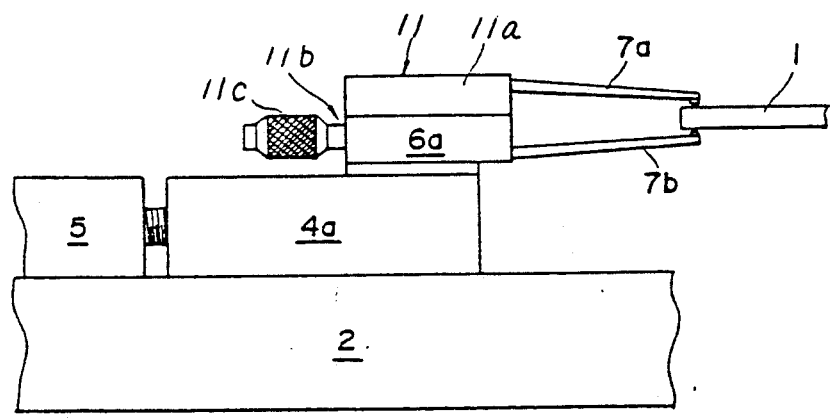
FIG. 3 is an enlarged detail of the micro adjustment carriage shown in FIG. 2.

Another embodiment of the present invention is shown in FIG. 2 and FIG. 3. In this embodiment, a micro adjustment carriage 11 has a well-known micrometer mechanism which is used to reciprocate a head 7a in the direction of the center of a spindle 3. As shown in FIG. 3, a base stage 11a of the micro adjustment carriage 11 is mounted on the upper surface of a head mounting board 6a. The base stage 11a is provided slidably in the direction of the center of a disk 1. The head mounting board 6a is provided with a micrometer feed mechanism 11a equipped with a spindle having a fine pitched thread screw (not shown) and a fixed nut thereby feeding the spindle. Therefore when a knob or a rotary draw tube 11c of the micrometer is rotated, the threaded spindle is moved, whereby the base stage 11a engaging the threaded spindle and the head 7a are moved.

In both of the above embodiments, a pair of the carriages 4a and 4b are provided diametrically opposed to each other with the spindle 3 at the center therebetween. However, the invention is also realized by disposing the carriages with their axes inclined at 60° or 90° to each other. Further in both embodiments, only one pair of carriages are provided. However, it is no doubt that the invention is also realized by providing two or more pairs of carriages. It should also be noted that although in both the embodiments the head 7a is mounted on the micro adjustment carriage, it is clear that the head 7b, 8a or 8b can be mounted on the micro adjustment carriage to obtain the same result.

What is claimed is:

1. A method of adjusting positions of magnetic heads of a hard disk testing apparatus comprising the steps of:

writing a test signal in the surfaces of both sides of a hard disk by a first pair of magnetic heads provided on a first carriage;

moving a second carriage while observing the written test signal by one of a second pair of magnetic heads provided on said second carriage;

stopping said second carriage when said one of said second pair of magnetic heads detects a maximum value of the written test signal;

moving the other head of said second pair of magnetic heads while observing the written test signal by said other head of said second pair of magnetic heads; and stopping said other head of said second pair of magnetic heads when said other head of said second pair of magnetic heads detects a maximum value of the written test signal.

* * * * *